Nov. 6, 1962   M. E. FITCH ET AL   3,062,988
CONTROL SYSTEM
Filed Feb. 26, 1959   3 Sheets-Sheet 1

M.E. FITCH
A. WARNICK
INVENTORS

BY
ATTORNEYS

Nov. 6, 1962         M. E. FITCH ET AL         3,062,988
                      CONTROL SYSTEM
Filed Feb. 26, 1959
                                              3 Sheets-Sheet 2

M. E. FITCH
A. WARNICK
INVENTORS

BY J. R. Faulkner
   D. H. Oster
   K. L. Berschling
              ATTORNEYS

United States Patent Office 3,062,988
Patented Nov. 6, 1962

3,062,988
CONTROL SYSTEM
Merle E. Fitch, Taylor, and Alan Warnick, Oak Park, Mich., assignors to Ford Motor Company, Dearborn, Mich., a corporation of Delaware
Filed Feb. 26, 1959, Ser. No. 795,653
10 Claims. (Cl. 317—5)

This invention relates to a control system for controlling the speed of a shaft in which the power to the shaft is reduced when the speed thereof exceeds a selected value. More particularly, the invention relates to a control system which cuts off the fuel supply to a gas turbine engine when the speed of a turbine shaft in said engine exceeds a selected safe value.

It is often desirable to reduce or cut off the power to a rotating shaft when the speed of said shaft exceeds a critical value which may damage machinery connected thereto. This is particularly important in a gas turbine engine in which turbines rotate at very high speeds. The turbines may disintegrate due to centrifugal force if the speeds exceed that for which the gas turbine is designed. If the load on a gas turbine engine is suddenly removed due to some type of mehcanical failure in the shafting or gearing, the speed of the turbine will rise very rapidly and may cause the turbine wheel to disintegrate. Such a disintegration may cause parts of the turbine wheel to fly through the casing of the machine to injure operating personnel.

According to the construction of the present invention, the power to a gas turbine engine may be reduced or cut off when the speed of a turbine shaft mounted therein exceeds a certain selected value. A combustion chamber which supplies motive fluid to a power turbine is connected to a fuel supply through an electrically operated valve. A pickup located adjacent the turbine shaft senses a change in position of a means mounted on the shaft when said means changes from one position to the other due to excessive speed. An electronic circuit is connected to the pickup and to the electrically operated valve for closing the valve when this speed is exceeded, thereby shutting off the fuel supply to the combustion chamber. The term electronic circuit is meant to include a circuit employing transistors, electron tubes or magnetic amplifiers. The circuit, however, is preferably transistorized with the magnetic pickup furnishing signals to the input circuit of a transistor means and with the electrically operated valve being located in the output circuit of the transistor means.

An object of the present invention is the provision of a control system in which the power to a shaft is reduced when the shaft speed exceeds a selected value.

Another object of the invention is the provision of a control system for cutting off the fuel supply to the engine when the speed of a turbine shaft mounted therein exceeds a selected value.

A further object of the invention is the provision a transistorized control system for cutting off the fuel supply to a gas turbine engine when the speed of a shaft mounted therein exceeds a selected value.

Other objects and attendant advantages will become readily apparent when the specification is considered in connection with the annexed drawings in which.

Figure 1:
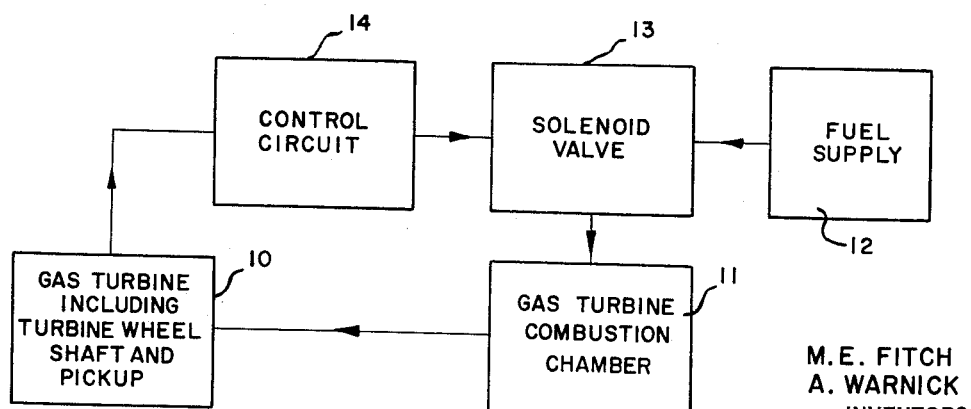
FIGURE 1 is a block diagram schematic of the present invention.

Referring now to the drawings in which like reference numerals designate like parts throughout the several views thereof, there is shown in FIGURE 1 a schematic of the present invention in block diagram in which a gas turbine engine including a turbine wheel, a shaft and a pickup is designated by the numeral 10. The gas turbine engine includes a combustion chamber 11 which receives fuel from a fuel supply 12 through a solenoid valve 13, when the valve is in the open position, and which supplies the motive fluid to operate the turbine. A control circuit 14 is connected to a pickup positioned in the gas turbine engine. The pickup senses the speed of the turbine shaft when the speed of the turbine and turbine shaft exceeds a selected value and causes the control circuit to shut the solenoid valve.

Figure 2:
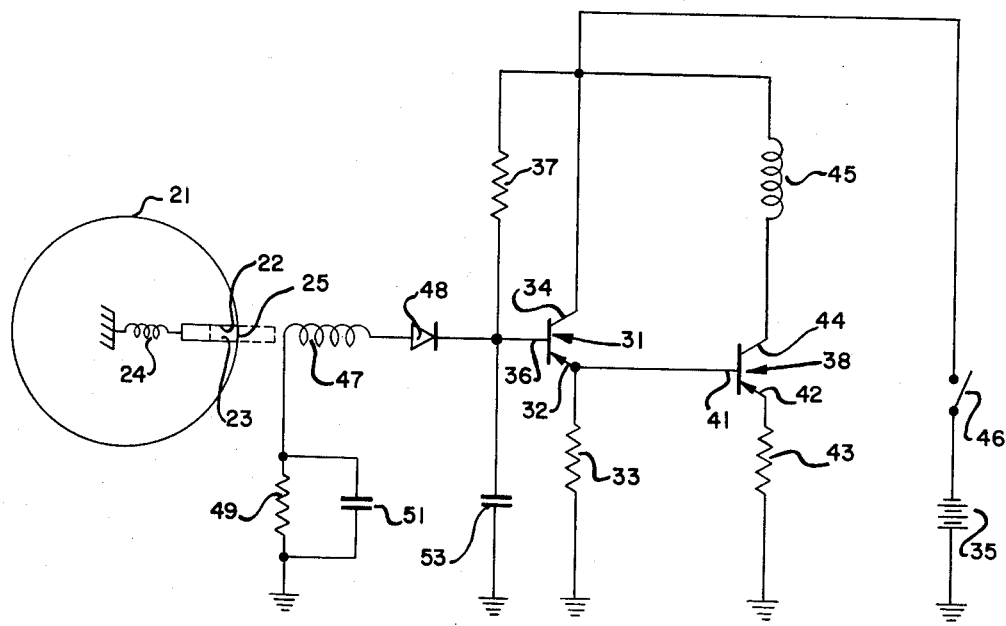
FIGURE 2 is a schematic of one embodiment of the control circuit of the present invention.

One embodiment of the invention showing the turbine shaft, the pickup and the control circuit is disclosed in FIGURE 2. A turbine shaft designated by the numeral 21 has a radial bore 22 positioned therein to receive a weight 23 which is biased inwardly by spring 24 so that the end 25 of the weight is flush with the shaft during normal operating speeds of the shaft. The weight 23 and spring 24 are designed so that the centrifugal force acting on the weight at a selected speed—the speed at which it is desired to cut off the fuel supply to the engine—overcomes the tension in the spring and the weight moves outwardly so that a portion thereof protrudes as shown by the dotted lines. This produces a signal in the control circuit which closes the solenoid valve thereby shutting off the fuel supply to the combushtion chamber.

The control circuit includes a transistor 31 having an emitter 32 connected to ground throu_h a resistor 33, and a collector 34 connected to a switch 46 which in turn is connected to the negative terminal of a battery 35. The positive terminal of the battery 35 is grounded. The base 36 of the transistor 31 is connected to the negative terminal of the battery 35 through a resistor 37 and the switch 46. A second transistor 38 has a base 41 connected between the emitter 32 of the transistor 31 and the resistor 33. The emitter 42 is connected to ground through a resistor 43 while the collector 44 is connected to the negative terminal of the battery 35 through the solenoid valve winding 45, and the switch 46. The solenoid valve winding 45, when energized, holds the valve in the open position.

An electromagnetic pickup 47 is positioned adjacent the shaft 21 and has one end connected to the base 36 of transistor 31 through a diode 48. The other end of the pickup 47 is connected to ground through a resistor 49 and a capacitor 51 which are connected in parallel.

In the operation of this embodiment of the invention, assuming the shaft 21 to be stationary and the switch 46 in the open position, the closing of the switch 46 will cause current to flow up through resistor 49 through the electromagnetic pickup 47, through diode 48 and then to the negative terminal of the battery 35 through the resistor 37 and switch 46. This causes the base 36 of the transistor 31 to be biased negative with respect to the emitter 32 as a result of the voltage division between the resistors 37 and 49. Before conduction of the transistor 31 begins, it is obvious that the emitter 32 is at ground potential, that of the positive terminal of the battery 35. When transistor 31 conducts, current flows through the resistor 33 thereby lowering the potential of the emitter 32 and the base 41 of transistor 38. This biases the base 41 negative with respect to the emitter 42 thereby causing the transistor 38 to conduct and the winding 45 to be energized. The energy in the winding 45 opens the solenoid valve 13 and permits fuel to flow into the combustion chamber 11 where it is burned to supply motive fluid to the gas turbine 10 causing the rotation of the shaft 21.

If for any reason the speed of the shaft 21 should exceed a selected safe value, that is, the speed where there is danger of the turbine disintegrating due to centrifugal force, the centrifugal force exerted on the weight 23 will overcome the tension in the spring 24 and the weight 23 will move radially outwardly thereby inducing a signal in the pickup 47 once during each revolution of the shaft. Once the weight starts to move outwardly it will rapidly move to the position shown in the dotted lines due to the increasing radius between the center of the shaft 21 and the centroid of the weight 23, since the centrifugal force acting on the weight varies directly as the second power of the lineal velocity and inversely as the first power of the radius. The diode 48 will permit only the positive portions of the pulses generated by the pickup 47 to pass thereby positively charging the top plate of the capacitor 53 which is connected to the base 36 of the transistor 31. This positive potential is applied to the base 36 of the transistor 31 thereby removing the bias between the emitter and the base and shutting the transistor off. This in turn removes the bias between the emitter 42 and the base 41 of the transistor 38 and shuts this transistor off thereby deenergizing the winding 45 and closing the solenoid valve 13. The fuel supply to the combustion chamber 11 is then cut off and the speed of the turbine will immediately be reduced.

When the speed of the shaft is reduced due to the power being cut off, the weight 23 will move back into the bore 22 in the shaft 21 and the winding 45 will once again be energized thereby permitting fuel to flow to the combustion chamber. The speed at which the weight 23 will move back into the bore 22 in the shaft is considerably lower than the speed at which it moves outwardly therefrom as the radius between the center of the shaft 21 and the centroid of the weight 23 is greater when the weight is in the outboard position than it is when the weight is in the inboard position. This follows from the fact that the centrifugal force acting on the weight 23 is proportional to the second power of the lineal velocity of the centroid of weight and inversely proportional to the radius between the center of the shaft and the centroid of the weight.

The time constant of the resistor 37 and the capacitor 53 must be high enough to maintain the transistor 31 cutoff during one complete revolution of the shaft 21 during the range of speed when the weight 23 is in the outboard position since a signal is induced in the pickup only once during each revolution of the shaft. The values of the resistor 37 and the capacitor 53 will, therefore, depend upon the speed of the shaft at which the weight 23 moves back into the bore in the shaft 21.

With reference to the resistor 49 and capacitor 51, it may be possible to eliminate these two components if there is enough voltage drop in the pickup 47 and the diode 48 to properly bias the transistor 31. It is preferred, however, to employ these two components and while the resistor provides the proper bias for the transistor 31, the path to ground of the pulses generated in the pickup 47 will be through the capacitor. The capacitor offers a very small impedance to high frequency alternating current components of the pulses and thus little power is dissipated as the resistor 49 is effectively bypassed.

Figure 3:
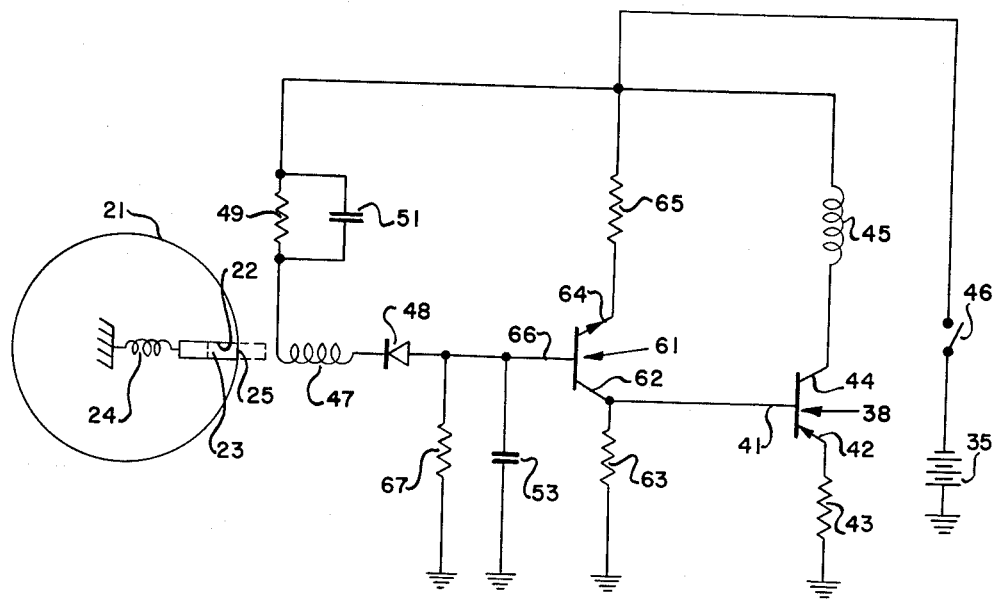
FIGURE 3 is a schematic of another embodiment of the control circuit.

The embodiment of the invention shown in FIGURE 3 is similar to that shown in FIGURE 2, however, in this instance the transistor which is connected to the pickup 47 is of the N-P-N type rather than the P-N-P type as designated by the numeral 31 in FIGURE 2. This transistor is generally designated by the numeral 61 and has a collector 62 connected to ground through a resistor 63 and an emitter 64 connected to the negative terminal of the battery 35 through a resistor 65 and the switch 46. The base 66 of the transistor is connected to the diode 48 which is reversed in polarity from the embodiment shown in FIGURE 2. The pickup 47 is connected to the negative terminal of battery 35 through the resistor 49 and capacitor 51 and switch 46. A resistor 67 is connected between the base 66 and ground and is in parallel with the capacitor 53.

When the switch 46 is closed current flows through resistor 67, diode 48, pickup 47, resistor 49 and hence to the negative terminal of the battery 35 through the switch 46. This provides the base 66 with a positive bias with respect to the emitter 64 thereby causing the transistor 61 to conduct. This, as in the embodiment shown in FIGURE 2, causes transistor 38 to conduct thereby energizing the winding 45 and opening the solenoid valve 13. When overspeed conditions of the shaft 21 are reached the weight 23 protrudes from the shaft and induces a signal in the pickup 47. Through the action of the diode 48 only the negative portions thereof are permitted to reach capacitor 53 thereby charging the top plate thereof negatively. This removes the bias between the emitter 64 and the base 66 of the transistor 61 thereby cutting off this transistor which in turn cuts off transistor 38. The winding 45 is then deenergized and the solenoid valve 13 is closed so that the combustion chamber 11 no longer receives fuel from the fuel supply 12.

In this embodiment the time constant of the resistor 67 and capacitor 53 must be high enough to maintain sufficient negative voltage at the base of the transistor to keep the transistor 61 cut off between signals induced in the pickup 47 during overspeed conditions. These signals are, of course, induced once every revolution of the shaft, when the weight 23 passes by the pickup 47.

Figure 4:
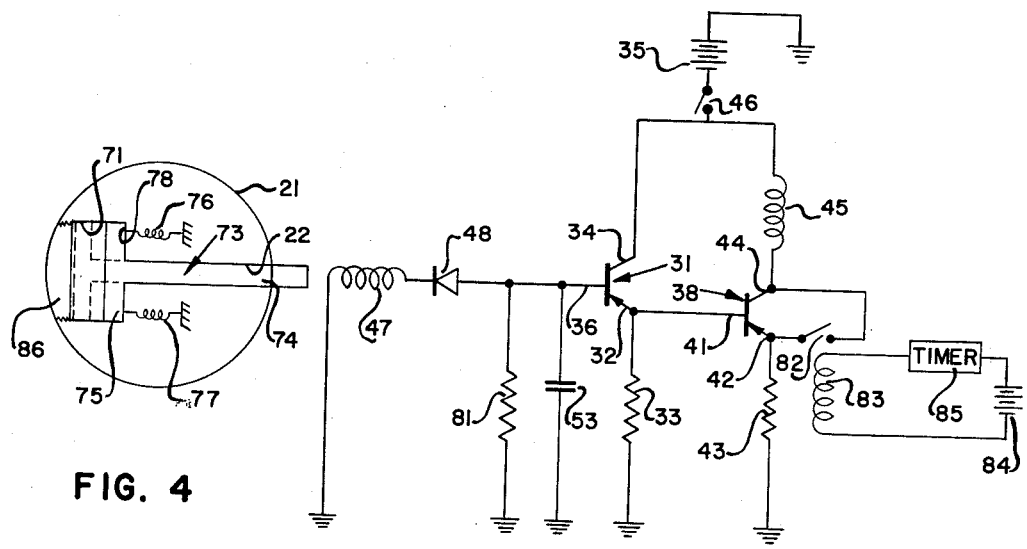
FIGURE 4 is a schematic of a third embodiment of the control circuit.

FIGURE 4 shows another embodiment of the invention in which a signal is generated in the pickup and applied to the control circuit to energize the solenoid winding and thereby keep the solenoid valve open during normal operating speeds. When overspeed conditions are reached, signals are no longer induced in the pickup and the control circuit is thereby deenergized closing the solenoid valve. To this end the shaft 21 is provided with a first radial bore 22 which extends through the center of the shaft and a second and larger radial bore 71. A centrifugal weight mechanism 73 comprising a long shaft 74 fitting into the radial bore 22 and a larger piston-like element 75 fitting into the bore 71 is biased by springs 76 and 77 so that the piston abuts one end wall 78 of the bore 71 and so that the end of shaft 74 protrudes from the shaft 21 as shown.

The circuit of this embodiment is similar to that shown in FIGURE 2 with the exception that there is no connection between the negative terminal of the battery 35 and the base of the transistor 36. The resistor 49 and capacitor 51 have also been eliminated in this circuit, and the diode 48 has been reversed. A resistor 81 is connected between the base 36 of the transistor and ground.

Prior to starting the turbine, that is with the shaft 21 stationary, it is obvious that no signals are induced in the winding 47. Furthermore, when the switch 46 is closed, the base 36 as well as the emitter 32 of the transistor 31 will come to the potential of the positive terminal of the battery 35 and the transistors 31 and 38 will remain cut off. However, the winding 45 must be energized to open solenoid valve 13 in order that fuel can reach the combustion chamber 11 from the fuel supply 12. To accomplish this, a connection is made across the transistor 38 between the collector 44 and the emitter 42 and an armature 82 of a normally open relay is interposed in this connection. The winding 83 of the relay is connected in series with a battery 84 and a timer 85. The timer is set for the period of time it takes to start the turbine, and this completes the circuit from the battery 84 through the timer 85 to the winding 83. When the winding 83 is energized, the armature 82 closes and current flows through resistor 43, relay armature 82, the contacts of the relay, which are closed, and then to the negative terminal of the battery 35 through the solenoid winding 45 and switch 46 thereby opening the valve 13 and permitting fuel to flow from the fuel supply 12 to the combustion chamber 11. The turbine is then started causing the shaft 21 to rotate and causing signals to be induced in the pickup 47. The negative portions of the signals are permitted to pass through the diode 48 and the positive portions are blocked thereby negatively charging the plate of the capacitor 53 connected to the base 36, and biasing the base 36 negative with respect to the emitter 32. This causes the transistor 31 to conduct which in turn causes the transistor 38 to conduct as explained above in connection with FIGURE 2. About this time the timer 85 interrupts the circuit between the battery 84 and the winding 83 so that the armature relay 82 opens the relay contacts and consequently the connection between the emitter 42 and the collector 44 of the transistor 38. The winding 45 is then, of course, energized by current flowing through the transistor 38.

When the speed of the shaft 21 reaches the value selected as the cutoff speed, the piston-like portion 75 of the centrifugal weight 73 is moved radially outwardly against a plug 86 which may be inserted in the bore 71, and the end of the portion 74 of the centrifugal weight mechanism moves radially inwardly so that the end thereof is flush with the shaft 21. When this occurs, signals can no longer be induced in the pickup 47 and the capacitor 53 discharges through the resistor 81 thereby removing the bias between the base 36 and the emitter 32 of the transistor 31. This shuts off transistors 31 and 38 and deenergizes the winding 45 to thereby close the solenoid valve 13 and shut off the fuel supply to the combustion chamber.

Figure 6:
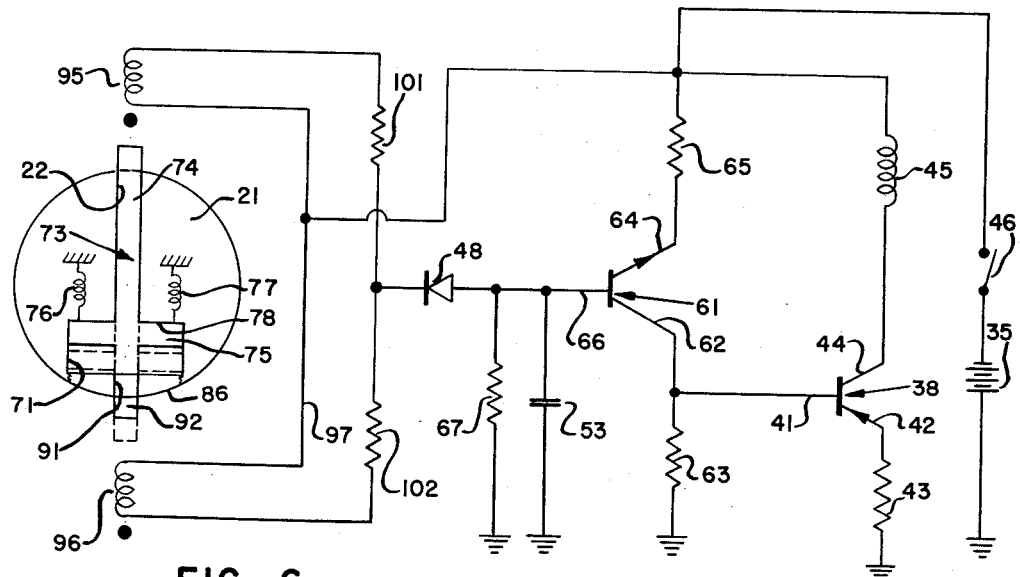
FIGURE 6 is a schematic of a fifth embodiment of the control circuit of the present invention.
Figure 5:
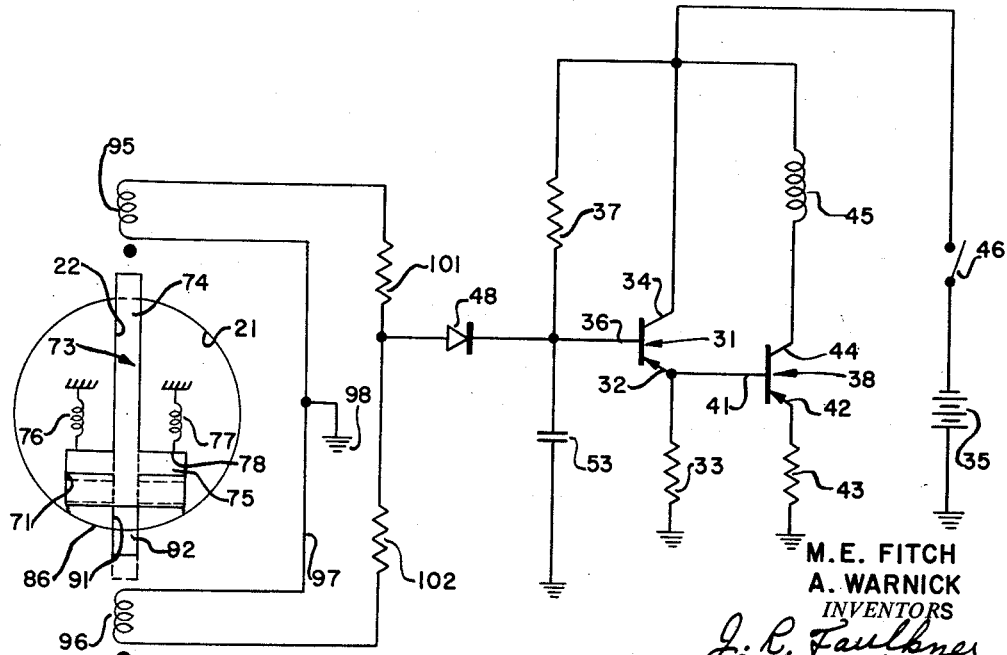
FIGURE 5 is a schematic of a fourth embodiment of the control circuit.

FIGURES 5 and 6 disclose another system of the present invention in which the shaft 21, in addition to being provided with the radial bores 22 and 71, is provided with a third radial bore 91 which may be conveniently positioned in the plug 86. The centrifugal weight 73, in addition to being provided with the shaft 74 and piston-like member 75, is provided with another shaft 92 which protrudes through the bore 91. Under normal operating conditions the springs 76 and 77 bias the piston against the end wall 78 of the bore 71 so that the ends of the shafts 74 and 92 protrude an equal amount from the surface of the shaft 21 as shown in the drawings. A pair of magnetic pickups 95 and 96 are provided near the circumference of the shaft and 180° apart. A conductor 97 connects one end of each of these windings while the other ends of the windings are connected through resistors 101 and 102.

Referring now specifically to FIGURE 5, the conductor 97 is grounded as at 98 while the terminal between the resistors 101 and 102 is connected to the diode 48. It will be noted from an inspection of FIGURES 2 and 5 that the control circuits to the right of the diode 48 are identical. When the switch 46 is closed current flows from the grounded connection 98 through pickup 95 and the resistor 101 to the diode 48 as well as from the grounded connection 98 through pickup 96 and resistor 102 to the diode 48. From the diode 48 current flows through the resistor 37 to the negative terminal of the battery 35 via switch 46 thereby providing a negative bias on the base 36 of the transistor 31 with respect to the emitter 32. This causes the transistor 31 to conduct which in turn causes transistor 38 to conduct thereby energizing the winding 45 and opening the solenoid valve 13. When the shaft 21 starts to rotate and up to speeds below that selected for cutoff, the portions of the shafts 74 and 92 which protrude from the shaft 21 induce signals of equal magnitude in the pickups 95 and 96. As shown by the dots on the windings of the pickups, the pickups are wound so that the signals induced are 180° out of phase and hence they are cancelled out at the junction between the resistors 101 and 102 and no signal reaches the base 36 of the transistor.

However, when the speed of the shaft 21 reaches the cutoff speed, the piston-like portion 75 of the centrifugal weight 73 will move radially outwardly, so that the end of shaft 92 will move farther outwardly from the circumference of the shaft 21 and so that the shaft portion 74 will recede into the shaft 21. This will increase the signals induced in the pickups by the shaft 92 and decrease the signals induced by the shaft 74 so that a resulting signal will appear at the diode 48 once every half revolution of the shaft. It is preferred to have the shaft 74 move inwardly so that the end thereof is flush with the circumference of the shaft 21, although as can be understood by the discussion above, this is not absolutely necessary. The diode permits only the positive portions of the signals to reach the capacitor 53 and hence the plate of the capacitor 53 which is connected to the base 36 of the transistor 31 is charged positively thereby removing the bias between the emitter 32 and the base 36. This shuts off the transistor 31 which in turn shuts off transistor 38 thereby deenergizing the winding 45 and closing the solenoid valve 13 as explained in the discussion of FIGURE 2.

The device shown in FIGURE 6 is similar to the device shown in FIGURE 5 with respect to the shaft, centrifugal weight and pickup arrangement. The basic circuit employed to the right of the diode 48 is, however, that shown in FIGURE 3 rather than that shown in FIGURE 2. The conductor 97 is connected to the negative terminal of the battery 35 through switch 46 rather than being grounded as it is in the embodiment shown in FIGURE 5.

When the switch 46 is closed current flows up through the resistor 67, through the diode 48, then to the negative terminal of the battery 35 through resistor 101, pickup 95 and switch 46, and to the negative terminal of the battery through the parallel path composed of resistor 102, pickup 96 and switch 46. A positive bias is thus provided on the base 66 of the transistor 61 with respect to the emitter 64 since the voltage of the battery 35 is effectively divided between the resistor 67 and the parallel connected resistors 101 and 102. This turns on the transistors 61 and 38 thus energizing the winding 45 and opening the solenoid valve 13. As with the embodiment shown in FIGURE 5, signals equal in magnitude but opposite in phase are induced in the pickups 95 and 96 during normal operating speeds of the shaft 21. When the cutoff speed of the shaft 21 is reached, the shaft 74 recedes into the shaft 21 and the shaft 92 protrudes to a greater extent thus giving a resultant signal at the diode 48. The diode 48 blocks the positive portion of these signals and permits only the negative portion thereof to pass thereby charging the top plate of the capacitor 53 negatively. This removes the bias between the emitter 64 and the base 66 of the transistor 61 thereby cutting off this transistor and transistor 38 in turn. The winding 45 is thus deenergized and the solenoid valve 13 is closed thereby shutting off the fel supply to the gas turbine combustion chamber.

With respect to the centrifugal weight generally designated by the numeral 73 in FIGURES 4 through 6, it is obvious that once the weight starts to move due to the centrifugal force generated at the selected speed that it will rapidly move to the position shown by the dotted lines for the reasons given in the discussion of the action of the weight 23 shown in FIGURES 2 and 3. Also the speed at which the weight will move from the position shown in the dotted lines back to the position shown in the solid lines is considerably lower than the speed at which it will move from the position shown by the solid lines to the position shown by the dotted lines. The reasons for this action are the same as those given with respect to the similar action by the weight 23, shown in FIGURES 2 and 3, and a further discussion thereof is considered unnecessary.

It is obvious from an inspection of FIGURES 2 through 6 that two transistors are employed to amplify sufficiently the signals emanating from the pickups. A single transistor may be employed if a sufficiently sensitive solenoid valve is used.

The embodiments of the present invention are fail safe in many respects. For example, the circuits shown in FIGURES 2 and 3 are fail safe with respect to power supply and opening of either transistor. The embodiment shown in FIGURE 4 is fail safe with respect to power supply, failure of the diode 48, opening of either transistor and for pickup failure. The embodiments shown in FIGURES 5 and 6 have approximately the same fail safeness as the embodiment shown in FIGURE 4 except for failure of the diode 48. These embodiments, however, do not require an override circuit, such as the timer circuit shown in FIGURE 4.

Thus the present invention provides a safe reliable control system for reducing or shutting off the power to a shaft when the speed of the shaft exceeds a certain value. The control system is particularly applicable for use in cutting off the fuel supply to a gas turbine engine when the speed of a turbine shaft mounted therein exceeds a selected safe speed.

It will be understood that the invention is not to be limited to the exact construction shown and described, and that various changes and modifications may be made without departing from the spirit and scope of the invention, as defined in the appended claims.

What is claimed is:

1. In a control system for controlling the overspeed of a shaft, a shaft, means for supplying power to the shaft, means controlling said means for supplying power to the shaft, a centrifugally operated weight mechanism positioned in a radial bore in said shaft, a portion of said centrifugally operated weight mechanism protruding from said shaft when the speed of said shaft exceeds a selected value, a transistor having an input and an output circuit, said means controlling said means for supplying power to the shaft being positioned in the output circuit of said transistor, means connected to the input circuit for biasing said transistor to conduct, a pickup positioned adjacent said centrifugally operated weight mechanism, a diode, said pickup being connected to the input circuit of said transistor through said diode, said centrifugally operated weight mechanism inducing signals in said pickup when said portion of said centrifugally operated weight mechanism protrudes from said shaft, said diode supplying a signal of one polarity to the input circuit of said transistor, said signal cutting off said transistor whereby said means controlling said means for supplying power is deenergized and the power to said shaft is reduced.

2. The control system of claim 1 in which said transistor is of the P-N-P type, the means connected to the input circuit of said transistor for biasing said transistor is connected to supply a negative bias to the base of said transistor with respect to the emitter thereof, and said diode is connected to supply a signal of positive polarity to the base of said transistor when the centrifugally operated weight mechanism protrudes from said shaft.

3. The control system of claim 1 in which said transistor is of the N-P-N type, the means connected to the input circuit of said transistor for biasing said transistor is connected to supply a positive bias to the base of said transistor with respect to the emitter thereof, and said diode is connected to supply a signal of negative polarity to the base of said transistor when the centrifugally operated weight mechanism protrudes from said shaft.

4. In a gas turbine engine, a combustion chamber, means for supplying fuel to said combustion chamber, an electrically operated valve controlling the supply of fuel to said combustion chamber, a turbine wheel driven by the products of combustion from said combustion chamber, a shaft driven by said turbine wheel, a centrifugally operated weight mechanism positioned in a radial bore in said shaft, a portion of said centrifugally operated weight mechanism protruding from said shaft when the speed of said shaft exceeds a selected value, a transistor having an input and an output circuit, means controlling the electrically operated valve positioned in the output circuit of said transistor, said electrically operated valve being positioned in the open position when said output circuit and said means are energized, means connected to the input circuit for biasing said transistor to conduct, a pickup means positioned on said gas turbine engine adjacent said centrifugally operated weight mechanism, a diode, said pickup being connected to the input circuit of said transistor through said diode, said centrifugally operated weight mechanism inducing signals in said pickup when the said portion of said centrifugally operated weight mechanism protrudes from said shaft, said diode supplying a signal of one polarity to the input circuit of said transistor, said signal cutting off said transistor and closing said electrically operated valve to shut off the fuel supply to said combustion chamber.

5. In a control system for controlling the overspeed of a shaft, means for supplying power to the shaft, means for controlling said means for supplying power to the shaft, said shaft having a first bore positioned therein and a second bore of larger diameter positioned therein, a centrifugal weight mechanism having a first portion positioned in said first bore and a second portion positioned in said second bore, means contacting said shaft and said centrifugal weight mechanism for biasing said centrifugal weight mechanism so that a portion of said first portion protrudes from said shaft, a transistor having an input and an output circuit, said means for controlling said means for supplying power to the shaft being positioned in the output circuit of said transistor, a pickup positioned adjacent said centrifugally operated weight mechanism, a diode, said pickup being connected to the input circuit of said transistor through said diode, said centrifugally operated weight mechanism inducing signals in said pickup when said shaft rotates, said diode supplying a signal of one polarity to the input circuit of said transistor to bias said transistor to conduct thereby energizing said means controlling said means for supplying power to the shaft, said centrifugal weight mechanism moving against the bias of said spring means when the speed of said shaft reaches a selected value so that portion which protruded from said shaft is moved inwardly to the point that the end thereof is flush with the shaft whereby the signal to the input circuit of said transistor is removed, the transistor is cut off and the means controlling the means for supplying power to said shaft is deenergized, and means coupled to the output circuit of said transistor for energizing said means for controlling said means for supplying power to said shaft during starting operations of said shaft.

6. In a control system for controlling the overspeed of a shaft, a shaft, means for supplying power to the shaft, means controlling said means for supplying power to the shaft, said shaft having a first bore positioned therein, a second bore of larger diameter than said first bore and a third bore of substantially the same diameter as said first bore, a centrifugal weight mechanism having a first portion positioned in said first bore, a second portion positioned in said second bore and a third portion positioned in said third bore, biasing means contacting said shaft and said centrifugal weight mechanism for biasing said centrifugal weight mechanism so that substantial equal portions extend from said shaft, a transistor having an input and an output circuit, said means for controlling said means for supplying power to said shaft being positioned in the output circuit of said transistor, a pair of electromagnetic pickups positioned 180° apart in spaced relationship to said shaft and adjacent said centrifugal weight mechanism, said electromagnetic pickup being wound so that one of said pickups produces signals 180° out of phase with the signals produced by the other of said pickups, said pickups being directly connected together at one end and being connected at the other end through a pair of equal resistors connected in series, a diode connected between said resistors and to the input circuit of said transistor, means connected to the input circuit of said transistor for biasing said transistor to conduct, said centrifugal weight mechanism inducing equal signals 180° out of phase in said electromagnetic pickups at shaft speeds below a selected value, said centrifugal weight mechanism moving against the force of said biasing means when the speed of said shaft reaches a selected value so that one of the portions protrudes farther from the periphery of the shaft than the other portion so that a larger signal is produced in one of said electromagnetic pickups than in the other during each half revolution of said shaft, said diode supplying a signal of one polarity to the input circuit of said transistor, said signal cutting off said transistor whereby said means controlling said means for supplying power is deenergized and the power supplied to said shaft is reduced.

7. The control system of claim 6 in which said transistor is of the P-N-P type, the means connected to the input circuit of said transistor for biasing said transistor is connected to supply a negative bias to the base of said transistor with respect to the emitter thereof, and said diode is connected to supply a signal of positive polarity to the base of said transistor when the speed of said shaft reaches said selected value.

8. The control system of claim 6 in which said transistor is of the N-P-N type, the means connected to the input circuit of said transistor for biasing said transistor is connected to supply a positive bias to the base of said transistor with respect to the emitter thereof, and said diode is connected to supply a signal of negative polarity to the base of said transistor when the speed of said shaft reaches said selected value.

9. In a control system for controlling the overspeed of a shaft, a shaft, means for supplying power to the shaft, means controlling said means for supplying power to the shaft, said shaft having a bore positioned therein, a centrifugal weight mechanism positioned in said bore, spring means connected to said centrifugal weight mechanism and said shaft for biasing said centrifugal weight mechanism to one discrete predetermined position when the speed of the shaft is below a selected level, said centrifugal weight mechanism moving from said one discrete predetermined position to another discrete position when the speed of the shaft reaches the selected level, pickup means positioned adjacent the shaft, said pickup means sensing the change of position of said centrifugal weight mechanism, a transistor having an input circuit connected to said pickup means, said transistor having an output circuit, said means controlling the means for supply power to the shaft being positioned in the output circuit of said transistor, and being operable upon said means for supplying power to the shaft to cut off the power supplied to the shaft when the speed thereof reaches said selected value.

10. In a gas turbine engine, a shaft, a centrifugally operated weight mechanism, spring means connected to said centrifugally operated weight mechanism and said shaft for biasing said centrifugally operated weight mechanism to a first discrete position when the speed of the shaft is below a selected level, said weight moving from said one discrete position to another discrete position when the speed of the shaft reaches a selected level, a combustion chamber, means for supplying fuel to said combustion chamber, a valve controlling the supply of fuel to said combustion chamber, a solenoid controlling said valve, a transistor having an input and an output circuit, said solenoid being positioned in the output circuit of said transistor, said solenoid being energized and said valve positioned in the open position when the output circuit of said transistor and the solenoid are energized, a pickup positioned adjacent the shaft, said pickup sensing the change in position of said centrifugally operated weight mechanism and connected to supply a change in signal when said centrifugally operated weight mechanism changes position, said change in signal deenergizing the output circuit of said transistor and said solenoid for closing said solenoid valve.

References Cited in the file of this patent

UNITED STATES PATENTS

| | | |
|---|---|---|
| 999,994 | Hawks | Aug. 8, 1911 |
| 2,468,459 | Pearce | Apr. 26, 1949 |
| 2,717,355 | Louden | Sept. 6, 1955 |
| 2,724,445 | Dinsmore | Nov. 22, 1955 |
| 2,772,378 | Farkas | Nov. 27, 1956 |
| 2,805,677 | Baird | Sept. 10, 1957 |
| 2,827,910 | Wells | Mar. 25, 1958 |
| 2,941,120 | Harman | June 14, 1960 |

FOREIGN PATENTS

| | | |
|---|---|---|
| 475,490 | Germany | Apr. 25, 1929 |